(12) United States Patent
O'Brien et al.

(10) Patent No.: US 6,273,613 B1
(45) Date of Patent: Aug. 14, 2001

(54) LOAD MEASUREMENT

(75) Inventors: Edwin W O'Brien; Fraser Wilson, both of Bristol; Peter Gawthorpe, Cheddar, all of (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/485,749

(22) PCT Filed: Dec. 22, 1999

(86) PCT No.: PCT/GB99/04383

§ 371 Date: Feb. 15, 2000

§ 102(e) Date: Feb. 15, 2000

(87) PCT Pub. No.: WO00/39542

PCT Pub. Date: Jul. 6, 2000

(30) Foreign Application Priority Data

Dec. 24, 1998 (GB) .................................................... 9828475

(51) Int. Cl.$^7$ ....................................................... F16C 32/00
(52) U.S. Cl. ............................................ 384/448; 384/624
(58) Field of Search .................................... 384/624, 627, 384/448; 177/136, 211; 73/862.627, 862.631

(56) References Cited

U.S. PATENT DOCUMENTS

| | | | |
|---|---|---|---|
| 3,499,500 | 3/1970 | Harding | 177/136 |
| 3,521,484 | 7/1970 | Dybvad et al. | 73/781 |
| 3,780,817 | * 12/1973 | Videon | 177/136 |
| 4,095,852 | * 6/1978 | Schutz | 384/202 X |
| 4,627,341 | 12/1986 | Sudbrack et al. | 100/41 |
| 4,718,282 | * 1/1988 | Bonfils | 73/855 |
| 4,850,552 | 7/1989 | Darden et al. | 244/100 R |
| 5,613,782 | * 3/1997 | Korting et al. | 384/448 X |

FOREIGN PATENT DOCUMENTS 1041031  9/1966  (GB) .

* cited by examiner

*Primary Examiner*—Thomas R. Hannon
(74) *Attorney, Agent, or Firm*—Nixon & Vanderhye P.C.

(57) ABSTRACT

A method of measuring load applied to a pin bearing and a pin bearing arrangement for use on an aircraft landing gear are provided. Relieving one or more of two adjacent bushes (4, 5, 6) bearing on a pin (1) of the pin bearing to create a zone of constant shear stress enables measurement of load and avoids cutting the pin.

7 Claims, 1 Drawing Sheet

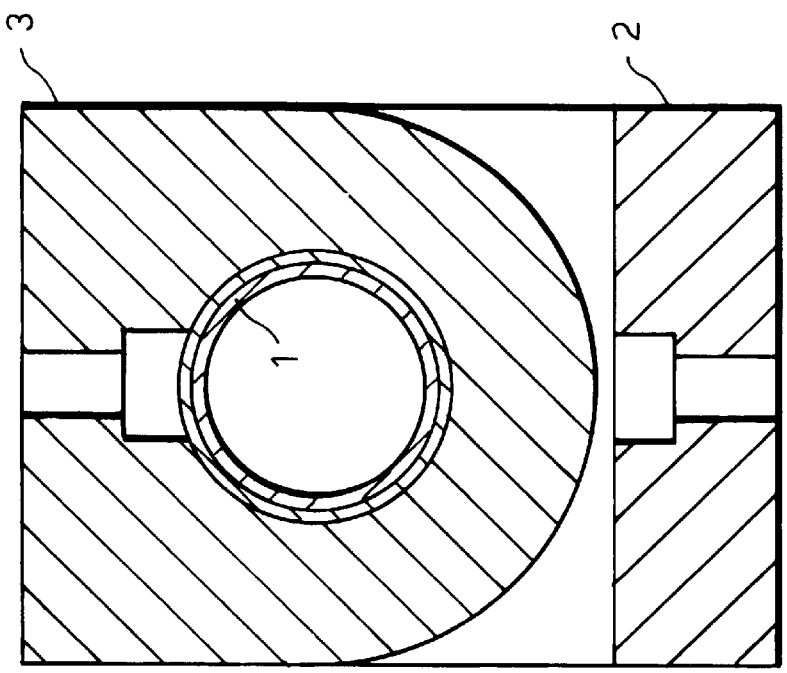
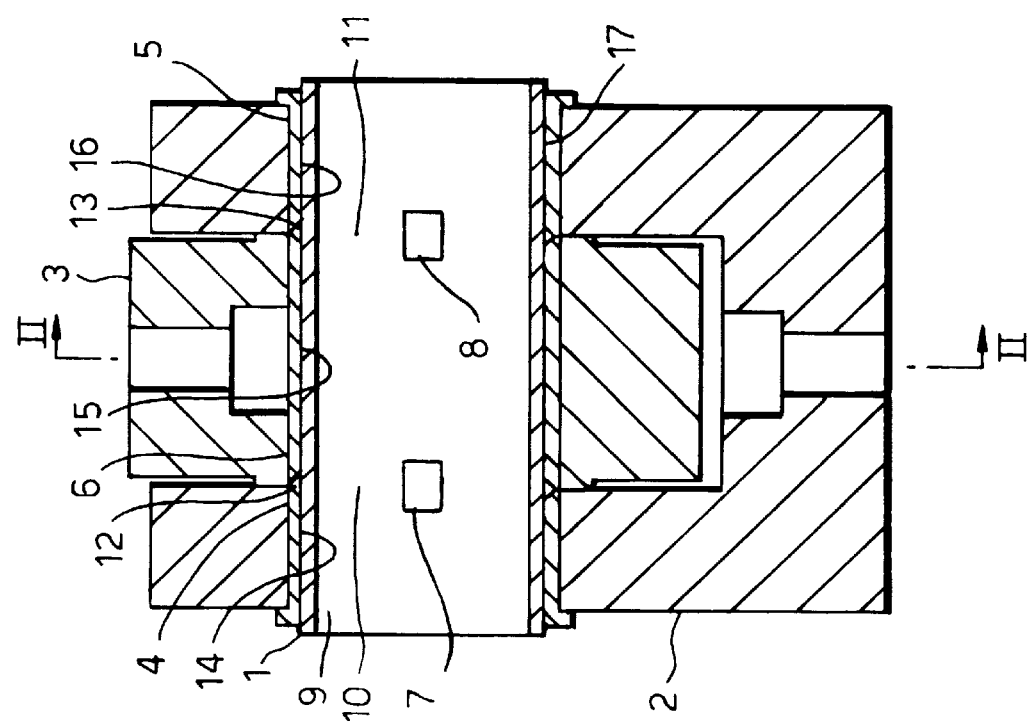

LOAD MEASUREMENT

This invention relates to load measurement and in particular to the measurement of loads supplied to pin bearings. The invention finds particular relevance in measuring ground loads applied to such pin bearings in aircraft landing gear.

In the measurement of shear forces applied to a pin of a pin bearing it is necessary to create a region of the pin which is subject to constant shear force for this to be measurable using strain gauges applied to the pin.

It is known to create such a region of constant applied shear force in the pin by forming a relief in the pin, normally in its outer bearing surface. The relief circumscribes the pin and has a length axially of the pin sufficient to create a said region of constant applied shear force to which one or more strain gauges may be attached, normally on an internal surface of the pin, for measuring the shear force.

A disadvantage of the above method is that the pin is weakened by the formation of the relief thereon. In applications where failure of the pin under load cannot be tolerated, such as on aircraft, a consequential increasing of the wall thickness of the pin is required. Such thickening of the pin can lead to load redistribution through the pin bearing owing to the increased stiffness of the pin. It can also lead to a significant increase in the weight of the equipment. In an aircraft landing gear such load redistribution through the pin bearing could lead to a discrepancy in performance between a flight test aircraft, upon which load testing had been done with the relieved pin bearing, and a production aircraft using a thinner walled pin. This could lead to doubt in the validity of qualification. Additionally, in an aircraft environment, such thickened flight test pins would require design qualification prior to installation.

Because of such difficulties as described above with thicker-walled pins it is the practice, when taking load measurements on aircraft landing gear, to apply strain gauges to other parts of tine landing gear. In practice it is very difficult if not impossible to find strain gauge locations which are sensitive to loads only in the single plane, despite the use of structural analysis/optimisation tests. Consequently the load in the desired plane of operation must be decoupled from loads in other planes by the use of inverse matrix transformation. Such decoupling algorithms are complex to produce and may be subject to accumulated error.

It is therefore an object of the invention to overcome the difficulties associated with the prior art.

According to one aspect of the invention there is provided a method of measuring load applied to a pin bearing, the pin bearing including at least two elements defining adjacent bearing surfaces which bear on the said pin, the said load being applied between the said adjacent bearing surfaces through a common bearing surface of the pin, the method including the steps of axially separating the said adjacent element bearing surfaces sufficient to create, in use, an axial length of pin over which constant shear force may be measured, attaching at least one strain gauge to the pin to measure the shear force transmitted through the pin across said axial length by the applied load, applying the load and measuring the load with the at least one strain gauge.

A standard pin, subject to normal aircraft certification procedures may therefore be used in the method of the invention and the need for the use of decoupling algorithms is removed. In addition current weight and balance technology for aircraft landing gear relies on beam bending to obtain the required data. Such beam bending for a wheel axle may lead to axle length changes which can, for example, cause stowage difficulties with the gear. Use of the method of the invention on a wheel axle will avoid any tendency for axle length changes.

A further application of the method or apparatus of the invention may be in substitution for the use of specially designed and developed large load cells on large test rigs, which can be very expensive to produce. The method and/or apparatus of the invention may provide a more cost effective way of obtaining load data.

According to a second aspect of the invention there is provided a pin bearing arrangement for measuring load applied therethrough, the arrangement including a pin and at least two elements defining adjacent bearing surfaces which bear on the pin, the said load being applied between the said adjacent bearing surfaces through a common bearing surface of the pin, the pin having at least one strain gauge attached thereto for measuring shear forces applied to the pin, wherein the said adjacent bearing surfaces are separated axially of the pin by a distance sufficient to permit the said measurement of shear forces by the at least one strain gauge.

Use of the apparatus of the invention can lead to large reductions in lead time for aircraft development and greater convenience owing to the ability of the pin of the invention to be calibrated as an element, and not in situ. The prior art by contrast required landing gear to be calibrated whilst fitted to the aircraft, generally using cables, winches and load cells.

In addition the method and/or apparatus of the invention can be used to collect load data from in-service aircraft where complex calibration or structural modification is not acceptable to the customer.

Further, a benefit of simplification of the load data acquisition method and/or apparatus is the likely avoidance of costly mistakes of more complex systems and methods.

Where more than one strain gauge is employed, adjustment of their orientation can enable measurement of both total load across the pin and a vector along which the load is acting.

A convenient means to achieve consistent positioning of the at least one strain gauge may be to provide means to prevent rotation of the pin.

The pin bearing is preferably a clevis pin arrangement in which a central bearing surface is defined on one member and a pair of bearing surfaces which sandwich the said central bearing surface are defined on a second member.

The arrangement is suitable for use on an aircraft landing gear, in particular for use as a pintle mounting arrangement.

The axial separation of the adjacent bearing surfaces may be increased or decreased as desired, provided the distance of separation is sufficient to permit the said measurement of shear forces. To achieve this end one or both of two adjacent bearing surface and/or bushes may be relieved.

The invention will now be described by way of example with reference to the accompanying drawing of which:

FIG. 1 is a vertical section through a bearing arrangement according to the invention, and FIG. 2 is a section of the bearing arrangement of FIG. 1 taken along the line II II of FIG. 1.

Referring to the drawings, a bearing pin 1 is shown forming a connection between elements or components 2 and 3 which together form a clevis arrangement. Component 2 houses two shouldered bushes 4, 5 and component 3 houses a plain bush 6. The bearing pin 1 has four strain gauges 7, 8 mounted on an inner surface 9 thereof. Only two of the strain gauges have been shown, for reasons of clarity. The strain gauges 7, 8 are mounted in positions on the bearing pin 1 to measure shear force across regions 10, 11 of the bearing pin. The shear force regions 10, 11 are created by axial separations 12, 13 of bearing surfaces 14, 15 and 15, 16 of the shouldered bush 4 and bush 6, and bush 6 and shouldered bush 5 respectively. Bearing surfaces 14, 15 and 16 of the bushes bear against a common bearing surface 17 of the bearing pin 1.

It will be appreciated that the axial separations 12, 13 of the bushes 4, 5 and 5, 6 may be increased or decreased according to the amount of relief applied to the bushes. In the context of an aircraft landing gear pintle bearing, an axial separation of approximately 3 mm has teen found to give acceptable results. Increase in axial separation of the bushes has been found to lead to improved load measurement accuracy.

According to the method of the invention an axial tension is applied to the bearing pin 1 during load testing. For initial load testing of a landing gear pintle bearing arrangement by the method of the invention the bearing pin 1 may be manufactured to design dimensions but made of an aluminium alloy in substitution for the material of the production bearing pin. The known differences in material properties between the aluminium alloy and the production material are then factored into calculations when measuring the shear force with the strain gauges.

According to the method of the invention, flight testing of an aircraft having a bearing arrangement according to the invention may be carried out using a production standard bearing pin instead of the thicker wall variety, or instead of the complex decoupling algorithms combined with detailed stress analysis associated with strain gauge positioning which is normally required when using prior art testing methods.

What is claimed is:

1. A method of measuring load applied to a pin bearing, the pin bearing including at least two elements defining adjacent bearing surfaces which bear on the said pin, the said load being applied between the said adjacent bearing surfaces through a common bearing surface of the pin, the method including the steps of axially separating the said adjacent element bearing surfaces sufficient to create an axial length of pin over which constant shear force may be measured, attaching at least one strain gauge to the pin to measure the shear force transmitted through the pin across said axial length by the applied load, applying the load and measuring the load with the at least one strain gauge.

2. A method as in claim 1 including the steps of providing at least two strain gauges, adjusting their orientation and measuring total load across the pin and a vector along which the load is acting.

3. A pin bearing arrangement for measuring load applied therethrough, the arrangement including a pin and at least two elements defining adjacent bearing surfaces which bear on the pin, the said load being applied between the said adjacent bearing surfaces through a common bearing surface of the pin, the pin having at least one strain gauge attached thereto for measuring shear forces applied to the pin, wherein the said adjacent bearing surfaces are separated axially of the pin by a distance sufficient to permit the said measurement of shear forces by the at least one strain gauge.

4. A pin bearing arrangement as in claim 3 including means to prevent rotation of the pin.

5. A pin bearing arrangement as in claim 3 in which the pin bearing is a clevis pin arrangement in which a central bearing surface is defined on one member and a pair of bearing surfaces which sandwich the said central bearing surface are defined on a second member.

6. A pin bearing arrangement as in claim 5 in which at least one of two adjacent bearing surfaces and/or bushes is relieved.

7. An aircraft landing gear including a pin bearing arrangement as in claim 3.

* * * * *